(12) United States Patent
Matsuno

(10) Patent No.: US 9,145,142 B2
(45) Date of Patent: Sep. 29, 2015

(54) VEHICLE CONTROL SYSTEM

(71) Applicant: Fuji Jukogyo Kabushiki Kaisha, Tokyo (JP)

(72) Inventor: Kouji Matsuno, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/794,474

(22) Filed: Mar. 11, 2013

(65) Prior Publication Data

US 2013/0253756 A1    Sep. 26, 2013

(30) Foreign Application Priority Data

Mar. 21, 2012  (JP) .................................. 2012-064178

(51) Int. Cl.

| | |
|---|---|
| *B60W 50/02* | (2012.01) |
| *B60W 50/029* | (2012.01) |
| *B60W 50/035* | (2012.01) |
| *B60W 30/182* | (2012.01) |
| *B60W 50/08* | (2012.01) |
| B60W 50/038 | (2012.01) |
| B60W 30/14 | (2006.01) |

(52) U.S. Cl.
CPC ........... *B60W 30/182* (2013.01); *B60W 50/035* (2013.01); *B60W 50/082* (2013.01); *B60W 30/146* (2013.01); *B60W 50/029* (2013.01); *B60W 50/0225* (2013.01); *B60W 50/038* (2013.01); *B60W 2050/021* (2013.01); *B60W 2050/0292* (2013.01); *B60W 2050/0295* (2013.01); *B60W 2750/308* (2013.01)

(58) Field of Classification Search
USPC ................. 701/36–48, 51–61, 63, 70, 71, 82, 701/93–99, 29.1, 29.2, 29.7, 29.9, 34.4, 701/300–302; 340/901–903, 426.24, 340/426.25, 435, 436, 438, 463–467; 700/2, 3, 40, 75, 249

See application file for complete search history.

(56) References Cited

U.S. PATENT DOCUMENTS

| | | | | |
|---|---|---|---|---|
| 5,513,107 | A  * | 4/1996 | Gormley ......................... | 701/48 |
| 6,757,599 | B2 * | 6/2004 | Nada ............................. | 701/29.2 |
| 6,847,864 | B2 * | 1/2005 | Goto et al. ...................... | 701/1 |
| 6,859,708 | B2 * | 2/2005 | Hashimoto et al. ............. | 701/48 |
| 7,349,776 | B2 * | 3/2008 | Spillane et al. ................ | 701/36 |
| 7,548,805 | B2 * | 6/2009 | Yamaguchi et al. ............ | 701/36 |
| 7,561,951 | B2 * | 7/2009 | Rao et al. ....................... | 701/48 |
| 7,577,508 | B2 * | 8/2009 | Fitzgibbons ................... | 701/70 |

(Continued)

FOREIGN PATENT DOCUMENTS

| | | |
|---|---|---|
| JP | 2006-282036 A | 10/2006 |
| JP | 2011-99394 A | 5/2011 |

*Primary Examiner* — Thomas Tarcza
*Assistant Examiner* — Tyler J Lee
(74) *Attorney, Agent, or Firm* — McGinn IP Law Group, PLLC.

(57) ABSTRACT

There is provided a vehicle control system configured to select one of driving modes which are associated with abnormalities of control units and are previously defined in a mapping table, and to output an execution command via CAN bus to a corresponding control unit that achieves the selected driving mode. In the above process, the driving modes stored in a driving mode change instruction unit each provide a driving state which enables a vehicle to perform safety driving reliably, while maintaining a minimum necessary driving performance even when an abnormality occurs in the relevant control units.

6 Claims, 4 Drawing Sheets

| DRIVING MODE | ENGINE CONTROL | TRANSMISSION CONTROL | BRAKE CONTROL | STEERING CONTROL | SUSPENSION CONTROL | PASSENGER PROTECTION CONTROL |
|---|---|---|---|---|---|---|
| THROTTLE OPENING LIMITING | — | O | | | | O |
| INTER-VEHICLE DISTANCE INCREASE | O | O | O | O | | O |
| VEHICLE SPEED LIMITING | | O | O | O | O | O |
| SIDESLIP PREVENTION CONTROL OFF DISABLING | | | — | O | O | O |

(56) References Cited

U.S. PATENT DOCUMENTS

| | | | |
|---|---|---|---|
| 8,155,843 B2* | 4/2012 | Takeda | 701/48 |
| 8,600,614 B2* | 12/2013 | Filev et al. | 701/36 |
| 2003/0171858 A1* | 9/2003 | Kondo | 701/29 |
| 2004/0220015 A1* | 11/2004 | Murakami et al. | 477/15 |
| 2010/0292881 A1* | 11/2010 | Takahashi | 701/22 |
| 2011/0125356 A1* | 5/2011 | Takahashi | 701/22 |
| 2012/0123622 A1* | 5/2012 | Miyazaki | 701/22 |
| 2013/0116876 A1* | 5/2013 | Park | 701/22 |
| 2014/0114523 A1* | 4/2014 | Hirasawa et al. | 701/22 |

* cited by examiner

FIG. 3

| DRIVING MODE | ENGINE CONTROL | TRANSMISSION CONTROL | BRAKE CONTROL | STEERING CONTROL | SUSPENSION CONTROL | PASSENGER PROTECTION CONTROL |
|---|---|---|---|---|---|---|
| THROTTLE OPENING LIMITING | — | ○ | | | | ○ |
| INTER-VEHICLE DISTANCE INCREASE | ○ | ○ | ○ | ○ | | ○ |
| VEHICLE SPEED LIMITING | | ○ | ○ | ○ | ○ | ○ |
| SIDESLIP PREVENTION CONTROL OFF DISABLING | | | — | ○ | ○ | ○ |

VEHICLE CONTROL SYSTEM

CROSS-REFERENCE TO RELATED APPLICATIONS

The present application claims priority from Japanese Patent Application No. 2012-064178 filed on Mar. 21, 2012, the entire contents of which are hereby incorporated by reference.

BACKGROUND OF THE INVENTION

1. Field of the Invention

The present invention relates to a vehicle control system which automatically shifts to an appropriate driving mode in the case where an abnormality occurs in an onboard control device.

2. Description of the Related Art

Generally, when an abnormality occurs in the control device, an onboard control device disables additional function of the control device while maintaining the basic function related to driving performance is maintained, compensate the vehicle performance using other remaining systems. As an example of the former, Japanese Unexamined Patent Application Publication (JP-A) No. 2011-99394 discloses a technology which sets a first driving power as a target driving power in a vehicle driving power control device when the vehicle driving power control device is in a failed state, the vehicle driving power control device including a driving power calculation unit configured to calculate a first driving power based on the related characteristics between an accelerator opening and the driving power of a driving power source, and to calculate a second driving power using the first driving power as a reference value, the second driving power decreasing gradually with an increase in elapsed time. As an example of the latter, Japanese Unexamined Patent Application Publication (JP-A) No. 2006-282036 discloses a technology which improves a roll restraining effect by increasing the stiffness of a stabilizer bar in the case where the roll restraining effect by a vehicle height adjustment device reduces in a vehicle suspension system including a roll restraining device which restrains the roll of the vehicle body.

Like the example of technology disclosed in the above-mentioned JP-A Nos. 2011-99394 and 2006-282036, when a warning light lights up due to an occurrence of an abnormality in a control device, a driver can recognize which control device has an abnormality, and attention to the driver is drawn. However, it is difficult for the driver to appropriately and immediately understand what operation should be done specifically for driving the vehicle until the control device having an abnormality is repaired. For example, in the case where an output is reduced due to an engine malfunction, the driving speed also decreases, however, the driver usually does not come up with the idea that a sufficient inter-vehicle distance should be taken in order to avoid unnecessary acceleration and deceleration. Thus it is difficult for the driver to take appropriate action except for repairing the vehicle quickly, and therefore, a solution for improving the safety of vehicle has been demanded.

SUMMARY OF THE INVENTION

The present invention has been made in view of the above-mentioned situations, and it is an object of the invention to provide a vehicle control system which can reliably perform safety driving while preventing dangerous vehicle driving state and maintaining a minimum necessary driving performance even when an abnormality occurs in an onboard control device.

An aspect of the present invention provides a vehicle control system including: a plurality of control units mounted in a vehicle; an abnormality detection unit configured to detect a control unit having an abnormality out of the control units; a driving mode storage unit configured to pre-store, as a driving mode, a driving state for allowing safe driving of the vehicle for each of the control units even when an abnormality occurs; and a driving mode execution unit configured to select and execute a driving mode stored in the driving mode storage unit in the case where the abnormality detection unit detects a control unit having an abnormality.

BRIEF DESCRIPTION OF THE DRAWINGS

FIG. 3 is a table illustrating a relationship between driving modes and a plurality of vehicle control units in which an abnormality occurs, and an exemplary display according to the embodiment in the present invention.

DESCRIPTION OF THE PREFERRED EMBODIMENTS

Figure 1:
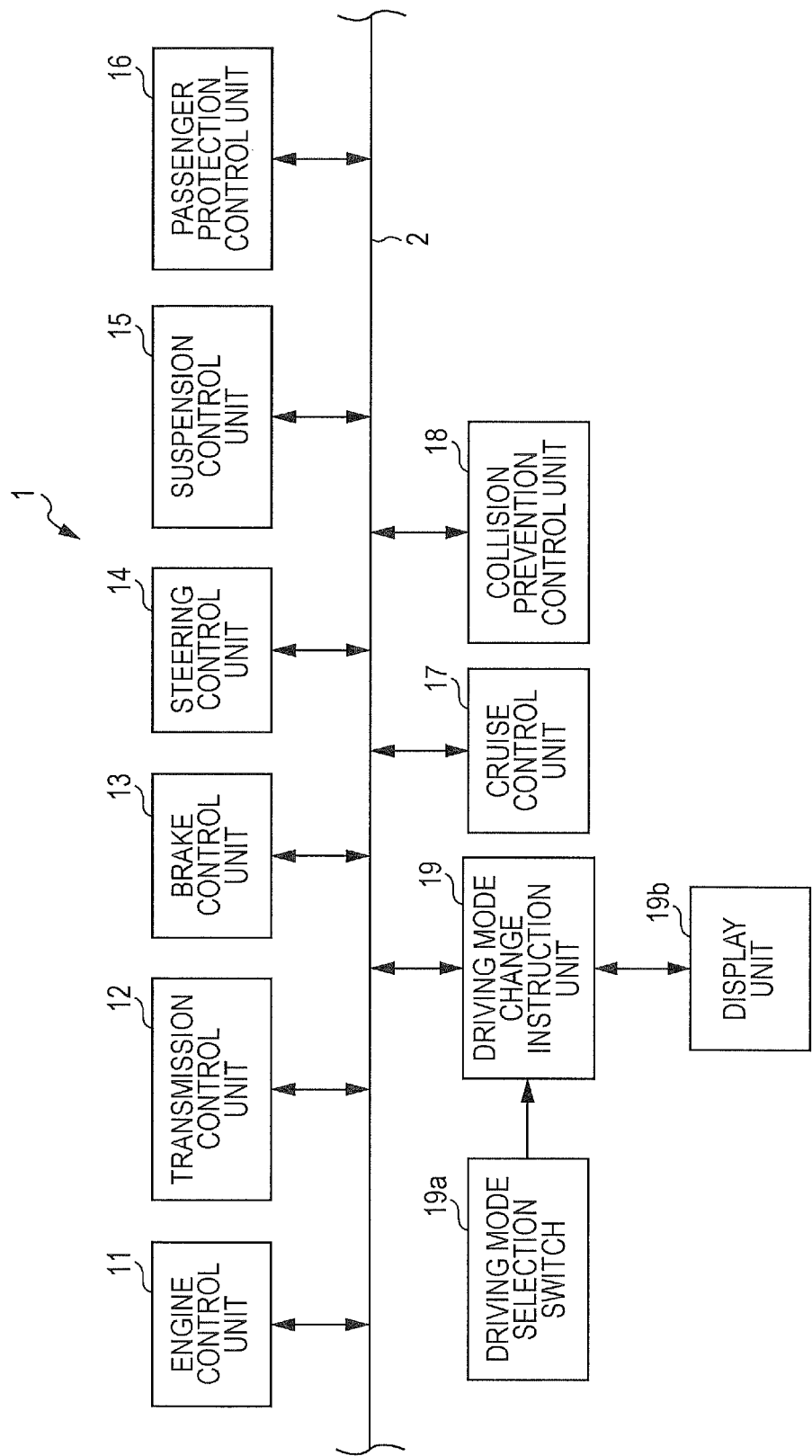
FIG. 1 is an illustrative diagram of a vehicle control system according to an embodiment in the present invention.

Hereinafter, an embodiment of the present invention will be described with reference to the accompanying drawings. In FIG. 1, reference symbol 1 indicates a vehicle control system which is constructed by connecting control units (an engine control unit 11, a transmission control unit 12, a brake control unit 13, a steering control unit 14, a suspension control unit 15, a passenger protection control unit 16, a cruise control unit 17, a collision prevention control unit 18, a driving mode change instruction unit 19) via a communication bus (CAN bus) 2 of CAN (Controller Area Network) communication, and sharing the signals of the control units, and the signals and the like detected by sensors and/or switches (not illustrated) which are connected to the control units 11 to 19.

The engine control unit 11 is a well known control unit configured to perform main control such as fuel injection control, ignition timing control, electronic controlled throttle valve control for an engine of a vehicle (not illustrated) based on, for example, a suction air quantity Ga, a throttle opening $\theta$th, an engine water temperature TW, an intake-air temperature TA, an oxygen concentration, a crank angle $\theta$CA, an accelerator opening $\theta$ACC, and other vehicle information. The engine control unit 11 has a fault diagnosis function, and in the case where an abnormality occurs in a sensor, a switch, or the like for input signals which are used in the engine control unit 11, or an output signal for a preset input signal is not obtained, the engine control unit 11 detects an abnormality of the engine control unit 11 itself. In the case where an abnormality of the engine control unit 11 itself is detected, an engine control unit abnormality flag FE is set (FE=1), and the flag FE is transmitted via CAN bus 2. In this manner, the engine control unit 11 is provided as a control unit and as an abnormality detection unit.

The transmission control unit 12 is a well known control unit configured to perform transmission control and the like for automatically setting a transmission gear of an automatic transmission (not illustrated) based on, for example, an inhibitor switch position, a vehicle speed V, a throttle opening θth, and other vehicle information. The transmission control unit 12 has a fault diagnosis function, and in the case where an abnormality occurs in a sensor, a switch, or the like for input signals which are used in the transmission control unit 12, or an output signal for a preset input signal is not obtained, transmission control unit 12 detects an abnormality of the transmission control unit 12 itself. In the case where an abnormality of the transmission control unit 12 itself is detected, a transmission control unit abnormality flag FT is set (FT=1), and the flag FT is transmitted via CAN bus 2. In this manner, the transmission control unit 12 is provided as a control unit and as an abnormality detection unit.

The brake control unit 13 is a well known control unit configured to perform well known sideslip prevention control capable of controlling braking devices (not illustrated) for four wheels independently of a brake operation by a driver based on, for example, a brake switch, wheel speeds of four wheels ωfl, ωfr, ωrl, ωrr, a steering angle θH, and a yaw rate γ, and other vehicle information. The sideslip prevention control by the brake control unit 13 can be freely set to ON or OFF by a driver. The brake control unit 13 has a fault diagnosis function, and in the case where an abnormality occurs in a sensor, a switch, or the like for input signals which are used in the brake control unit 13, or an output signal for a preset input signal is not obtained, the brake control unit 13 detects an abnormality of the brake control unit 13 itself. In the case where an abnormality of the brake control unit 13 itself is detected, a brake control unit abnormality flag FB is set (FB=1), and the flag FB is transmitted via CAN bus 2. In this manner, the brake control unit 13 is provided as a control unit and as an abnormality detection unit.

The steering control unit 14 is a well known control unit configured to control an assist torque based on, for example, a vehicle speed V, a steering torque Ts, a steering angle θH, and a yaw rate γ, and other vehicle information, the assist torque being generated by an electric power steering motor (not illustrated) disposed in the steering system of the vehicle. The steering control unit 14 has a fault diagnosis function, and in the case where an abnormality occurs in a sensor, a switch, or the like for input signals which are used in the steering control unit 14, or an output signal for a preset input signal is not obtained, the steering control unit 14 detects an abnormality of the steering control unit 14 itself. In the case where an abnormality of the steering control unit 14 itself is detected, a steering control unit abnormality flag FST is set (FST=1), and the flag FST is transmitted via CAN bus 2. In this manner, the steering control unit 14 is provided as a control unit and as an abnormality detection unit.

The suspension control unit 15 is a well known control unit configured to control the damping force of a shock absorber (not illustrated) based on, for example, a vehicle speed V, a steering angle θH, upper-spring vertical accelerations of four wheels, $(d^2 zsfl/dt^2)$, $(d^2 zsfr/dt^2)$, $(d^2 zsrl/dt^2)$, $(d^2 zsrr/dt^2)$, lower-spring vertical accelerations of four wheels, $(d^2 zufl/dt^2)$, $(d^2 zufr/dt^2)$, $(d^2 zurl/dt^2)$, $(d^2 zurr/dt^2)$, and other vehicle information, the shock absorber being interposed between the vehicle body and the wheels and having a variable damping force characteristic. The suspension control unit 15 has a fault diagnosis function, and in the case where an abnormality occurs in a sensor, a switch, or the like for input signals which are used in the suspension control unit 15, or an output signal for a preset input signal is not obtained, the suspension control unit 15 detects an abnormality of the suspension control unit 15 itself. In the case where an abnormality of the suspension control unit 15 itself is detected, a suspension control unit abnormality flag FSU is set (FSU=1), and the flag FSU is transmitted via CAN bus 2. In this manner, the suspension control unit 15 is provided as a control unit and as an abnormality detection unit.

The passenger protection control unit 16 is a control unit configured to control a well known pretensioner function (function of instantly rolling up a belt and restraining a driver in an emergency situation of a vehicle of receiving a strong impact), a force limiter function (function of allowing the belt to be pulled out from the retractor and maintaining a load applied to the belt at a predetermined level) of a three-point seat belt (not illustrated) of the driver's seat or the assistant driver's seat, and an airbag deployed in a collision, based on, for example, a vehicle speed V, a front-and-rear acceleration Gx, and other vehicle information. The passenger protection control unit 16 has a fault diagnosis function, and in the case where an abnormality occurs in a sensor, a switch, or the like for input signals which are used in the passenger protection control unit 16, or an output signal for a preset input signal is not obtained, the passenger protection control unit 16 detects an abnormality of the passenger protection control unit 16 itself. In the case where an abnormality of the passenger protection control unit 16 itself is detected, a passenger protection control unit abnormality flag FSA is set (FSA=1), and the flag FSA is transmitted via CAN bus 2. In this manner, the passenger protection control unit 16 is provided as a control unit and as an abnormality detection unit.

The cruise control unit 17 is a control unit configured to perform constant speed driving, as well known, at a vehicle speed setting selected by a driver when there is no forward objects including a preceding vehicle, and to follow a preceding vehicle if exists with an inter-vehicle time selected by a driver, based on, for example, image information from a (single lens or stereo type) camera, information on the distances to forward objects including the preceding vehicle, obtained by a laser radar, a vehicle speed V, signals from switches in cruise control (a switch for a driver to increase/decrease the vehicle speed setting, a switch for a driver to set an inter-vehicle time (the time obtained by dividing the inter-vehicle distance to the preceding vehicle by the vehicle speed) with respect to the preceding vehicle), and other vehicle information.

The collision prevention control unit 18 is a control unit configured to calculate TTC (Time-To-Collision, the time obtained by dividing the distance between the vehicle and the forward object by the relative speed between the vehicle and the forward object), as well known, for the forward object with respect to the vehicle when forward objects including a preceding vehicle are detected, based on, for example, image information from a (single lens or stereo type) camera, information on the distances to the forward objects including the preceding vehicle, obtained by a laser radar, a vehicle speed V, and other vehicle information. The collision prevention control unit 18 gives a warning to a driver and/or applies an automatic brake when the TTC decreases to a lower value less than a threshold value.

The driving mode change instruction unit 19 receives a signal from a driving mode selection switch 19a, and above-mentioned abnormality flags FE, FT, FB, FST, FSU, FSA from the respective control units 11, 12, 13, 14, 15, 16. The driving mode change instruction unit 19 then selects one of the driving modes which are associated with abnormalities of the above-mentioned control units 11, 12, 13, 14, 15, 16, and are previously defined in a mapping table based on the below-described fail safe control program, and outputs an execution command via CAN bus 2 to a control unit which achieves the selected driving mode. In the above step, the driving modes stored in the driving mode change instruction unit 19 each provide a driving state which enables the vehicle to perform safety driving reliably, while maintaining a minimum necessary driving performance even when an abnormality occurs in the relevant control units.

Specifically, in the present embodiment, four types of driving modes: "throttle opening limiting", "inter-vehicle distance increase", "vehicle speed limit", and "sideslip prevention control OFF disabled" driving modes are defined as illustrated in FIG. 3.

Figure 4:
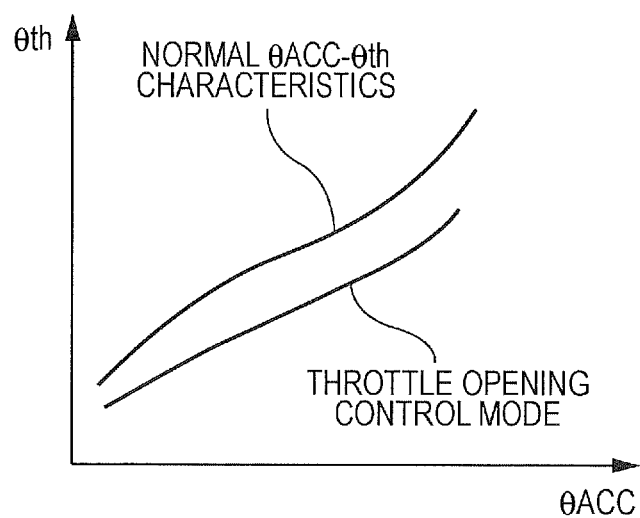
FIG. 4 is a graph illustrating a throttle opening limiting mode according to the embodiment in the present invention.

Here, "throttle opening limiting" driving mode is a mode which is commanded to be performed on the engine control unit 11. For example, as illustrated in FIG. 4, in the control of an electronic controlled throttle valve for engine control in the above-mentioned driving mode, the characteristic level of throttle opening θth with respect to accelerator opening θACC is reduced to a level lower than normal characteristics level, or the rate of change in throttle opening θth with respect to accelerator opening θACC is changed to a lower rate.

The "throttle opening limiting" driving mode is adapted to be selectively set in consideration of the following situation: in the case where an abnormality occurs in the transmission control unit 12 (FT=1) and there exists an abnormality in selection of transmission gears, when the engine output is too high, intended acceleration or deceleration is difficult to be achieved, and thus ensuring of safety is difficult.

In addition, "throttle opening limiting" driving mode is adapted to be selectively set in consideration of the following situation: in the case where an abnormality occurs in the passenger protection control unit 16 (FSA=1) and there exists an abnormality in a seat belt device or an air bag device, passengers may not be protected normally in the case of a vehicle collision, and thus acceleration of the vehicle is reduced so as to ensure safety.

The "throttle opening limiting" driving mode is not selectively set in the case where an abnormality occurs in the engine control unit 11 itself (FE=1) which executes the above driving mode because the driving mode itself cannot be performed.

The "inter-vehicle distance increase" driving mode is a mode which is commanded to be performed on the cruise control unit 17 and the collision prevention control unit 18. A command is issued to the cruise control unit 17, so that the inter-vehicle time with respect to a preceding vehicle is corrected to be longer than the current inter-vehicle time selected by a driver, and another command is issued to the collision prevention control unit 18, so that a threshold value to be compared with the TTC is corrected to be longer. That is to say, a correction is made, so that the inter-vehicle distance with respect to the preceding vehicle is set to be longer, and the brake timing for an object is set to be earlier.

Thus, in the case where an abnormality occurs in the engine control unit 11 itself (FE=1), the inter-vehicle distance with respect to a preceding vehicle is corrected to be longer, and the brake timing for an object is corrected to be earlier in order to ensure safety even when an excessive acceleration occurs.

In the case where an abnormality occurs in the transmission control unit 12 (FT=1), and in a situation where hazard prevention driving is difficult, for example, an excessive acceleration occurs because of an abnormal transmission gear or expected acceleration is not achieved with an intended transmission gear, the inter-vehicle distance with respect to a preceding vehicle is corrected to be longer, and the brake timing for an object is corrected to be earlier in order to ensure safety.

Furthermore, even in the case where an abnormality occurs in the brake control unit 13 (FB=1) and deceleration performance cannot be sufficiently exhibited, an abnormality occurs in the steering control unit 14 (FST=1) and an object cannot be avoided by steering, or an abnormality occurs in the passenger protection control unit 16 (FSA=1) and passengers may not be protected normally in the case of a vehicle collision, the inter-vehicle distance with respect to a preceding vehicle is corrected to be longer, and the brake timing for the object is corrected to be earlier in order to ensure safety.

The "vehicle speed limit" driving mode is a mode which is commanded to be performed on the cruise control unit 17 and the engine control unit 11. A correction command is issued to the cruise control unit 17, so that the upper limit of the vehicle speed setting selected by a driver is reduced to a lower level to achieve constant speed driving, and another correction command is issued to the engine control unit 11, so that the upper limit of a speed limiter is reduced to a lower level.

Thus, even in the case where an abnormality occurs in the transmission control unit 12 (FT=1), and an excessive acceleration occurs because of an abnormal transmission gear or transmission to a higher gear occurs, the speed of the vehicle is prevented from being increased, and thus safety of the vehicle is ensured. Furthermore, even in the case where an abnormality occurs in the brake control unit 13 (FE=1) and deceleration performance cannot be sufficiently exhibited, an abnormality occurs in the steering control unit 14 (FST=1) and an object cannot be avoided by steering, an abnormality occurs in the suspension control unit 15 (FSU=1) and roll stiffness cannot be controlled appropriately, or an abnormality occurs in the passenger protection control unit 16 (FSA=1) and passengers may not be protected normally in the case of a vehicle collision, the speed of the vehicle is controlled to be lower and thus safety of the vehicle is ensured.

In addition, "sideslip prevention control OFF disabled" driving mode is a mode in which sideslip prevention control is commanded to be performed on the ON/OFF selectable brake control unit 13 by a driver. In the "sideslip prevention control OFF disabled" driving mode, sideslip prevention control OFF state selected by a driver is disabled, and thus safety driving by the sideslip prevention control is performed.

By activating the "sideslip prevention control OFF disabled" driving mode, even in the case where an abnormality occurs in the steering control unit 14 (FST=1) and an object cannot be avoided by steering, an abnormality occurs in the suspension control unit 15 (FSU=1) and roll stiffness cannot be controlled appropriately, or an abnormality occurs in the passenger protection control unit 16 (FSA=1) and passengers may not be protected normally in the case of a vehicle collision, the yaw moment of the vehicle is appropriately applied by the sideslip prevention control, and thus safety of the vehicle is ensured. In the case where an abnormality occurs in the brake control unit 13 (FB=1), there is a possibility that sideslip prevention control may not be appropriately performed by the brake control unit 13, and thus "sideslip prevention control OFF disabled" driving mode is not activated. In this manner, the driving mode change instruction unit 19 serves as a driving mode storage unit and a driving mode execution unit.

Each of the four types driving modes: "throttle opening limiting", "inter-vehicle distance increase", "vehicle speed limit", and "sideslip prevention control OFF disabled" driving modes for safety driving is adapted to be selected and enabled by a driver as desired using the driving mode selection switch 19a connected to the driving mode change instruction unit 19. Even in the case where a driving mode is selected and activated by a driver as desired, if an abnormality occurs in a control unit, a driving mode selected and activated for the abnormality of the control unit is preferentially set and activated. That is to say, the driving mode selection switch 19*a* is provided as a selection unit.

A display unit 19*b* as an informing unit is connected to the driving mode change instruction unit 19. The display unit 19*b* displays a screen similar to e.g., the above-mentioned FIG. 3 on a monitor such as a multifunction display, and lights up currently selected driving mode and a control unit in which an abnormality has occurred, thereby informing of the current state of the vehicle.

For example, when the columns of "engine control", "transmission control", "brake control", "steering control", "suspension control", "driver protection control" are not lighted, and only the column of "inter-vehicle distance increase" is lighted, the light indicates that the driver has selected the "inter-vehicle distance increase" driving mode. In the case where no driving mode is selected by a driver, the column of the driving modes are turned off. When the crosspoints of the "suspension control" column and "vehicle speed limit", "sideslip prevention control OFF disabled" rows are lighted, the light indicates that an abnormality occurs in the suspension control unit 15, and a control device 1 selects and sets "vehicle speed limit" and "sideslip prevention control OFF disabled" driving modes.

With the display unit 19*b*, a driver can immediately understand the abnormality of the control unit of the current vehicle and why the vehicle is set in the current driving state, and may drive the vehicle based on the understanding which serves as a reference for driving vehicle during a period from the occurrence of the abnormality until the vehicle is repaired. Therefore, even when an abnormality occurs in an onboard control device, it is possible to reliably perform safety driving while preventing dangerous vehicle driving state and maintaining a minimum necessary driving performance.

Figure 2:
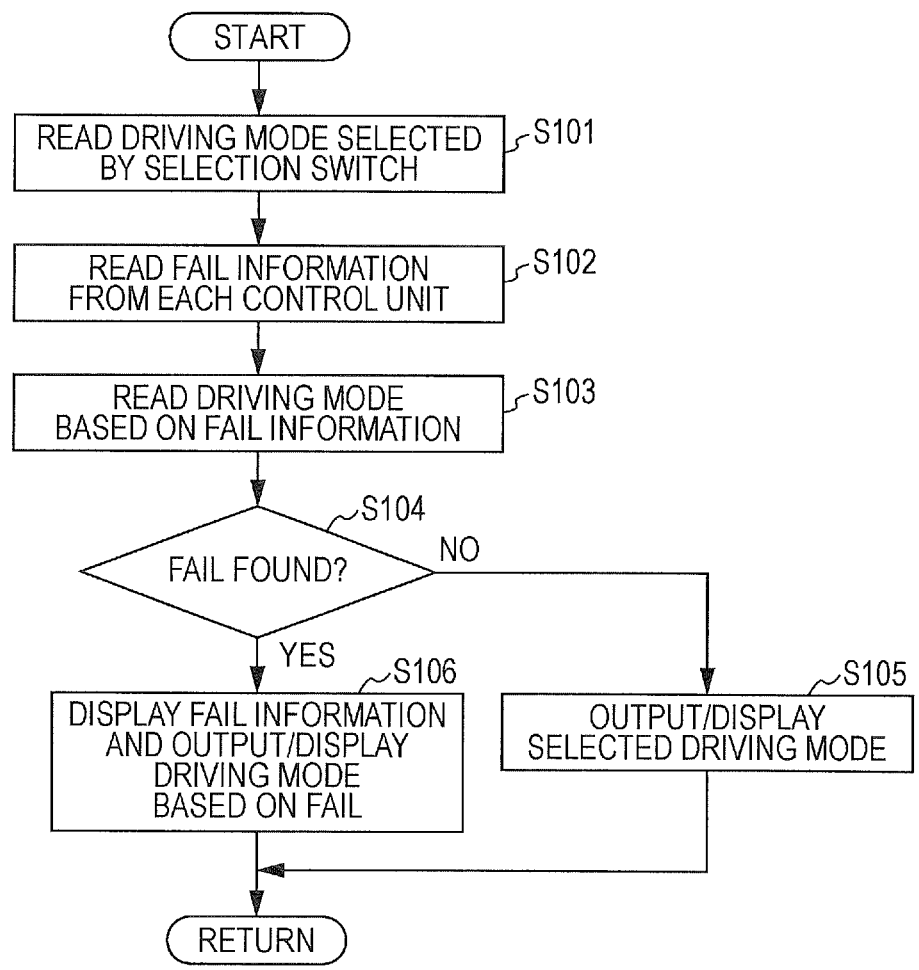
FIG. 2 is a flowchart of a fail safe control program of the vehicle control system according to the embodiment in the present invention.

Next, the fail safe control program executed by the driving mode change instruction unit 19 will be described with reference to the flowchart of FIG. 2. First, in step (hereinafter abbreviated as "S") 101, the driving mode selected by a driver with the driving mode selection switch 19*a* is read.

Next, the flow proceeds to S102, and the abnormality flags FE, FT, FB, FST, FSU, FSA are read from the control units 11, 12, 13, 14, 15, 16 as fail information, respectively.

Subsequently, the flow proceeds to S103, and the driving modes corresponding to the control units which have previously set abnormality flags FE, FT, FB, FST, FSU, FSA are read with reference to a predefined mapping table as illustrated in FIG. 3.

Next, the flow proceeds to S104, and it is determined whether or not any of the abnormality flags FE, FT, FB, FST, FSU, FSA indicates a failure (whether or not an abnormality flag has been set), and in the case where there is no indication of failure in all the abnormality flags, the flow proceeds to S105. In the case where there is a driving mode selected by the driver, a command corresponding to the selected driving mode is outputted to the above-mentioned control unit which is caused to execute the command, while the driving mode selected by the driver is lighted on the display unit 19*b*. In the case where there is no driving mode selected by the driver, no driving mode is set and lighted on the display unit 19*b*.

On the other hand, in the case where any one of the abnormality flags FE, FT, FB, FST, FSU, FSA indicates a failure (an abnormality flag has been set) in the above-mentioned S104, the flow proceeds to S106, and with reference to the mapping table of FIG. 3, the driving mode corresponding to the control unit which has failed (an abnormality flag has been set) is preferentially selected rather than the driving mode selected by the driver. A command corresponding to the selected driving mode is outputted to the above-mentioned control unit which is caused to execute the command, while a corresponding abnormal control unit and the driving mode selected by the driver are lighted on the display unit 19*b*.

Thus, according to the embodiment in the present invention, one of the driving modes which are associated with abnormalities of the control units 11, 12, 13, 14, 15, 16, and are previously defined in the mapping table is selected, and an execution command is outputted via CAN bus 2 to a control unit which achieves the selected driving mode. In the above step, the driving modes stored in the driving mode change instruction unit 19 each provide a driving state which enables the vehicle to perform safety driving reliably, while maintaining a minimum necessary driving performance even when an abnormality occurs in the relevant control devices. Thus, even when an abnormality occurs in an onboard control device, it is possible to reliably perform safety driving while preventing dangerous vehicle driving state and maintaining a minimum necessary driving performance. According to the embodiment in the present invention, with the display unit 19*b*, a driver can immediately understand an abnormality of the control unit of the current vehicle and why the vehicle is set in the current driving state, and may drive the vehicle based on the understanding which serves as a reference for driving vehicle during a period from the occurrence of the abnormality until the vehicle is repaired.

In the embodiment in the present invention, an example has been described, in which six control units: the engine control unit 11, the transmission control unit 12, the brake control unit 13, the steering control unit 14, the suspension control unit 15, and the passenger protection control unit 16 are used as the control units for detecting an abnormality. However, without being limited to the above example, another control unit such as a fore-and-aft driving power distribution control unit, or a left-and-right driving power distribution control unit may be added and applied to the present invention. These control units are not limited to the combination of six control units in the present application, and a combination of two or more control units may be applied to the invention in accordance with the specification of the vehicle.

What is claimed is:

1. A vehicle control system comprising:
   a plurality of control units mounted in a vehicle;
   an abnormality detection unit configured to detect a control unit having an abnormality out of the control units;
   a driving mode storage unit configured to pre-store, as a driving mode, a driving state for allowing safe driving of the vehicle for each of the control units even when an abnormality occurs;
   a driving mode execution unit configured to select an adequate mode defined in a predetermined mapping table and execute the driving mode stored in the driving mode storage unit in a case where the abnormality detection unit detects a control unit having an abnormality, the adequate mode being selected in order to maintain a minimum necessary driving performance even when the abnormality detection unit detects the control unit having the abnormality;
   an informing unit including a display to inform of the control unit having an abnormality which is detected by the abnormality detection unit, and the driving mode selected and executed by the driving mode execution unit, the informing unit configured to inform a current state of the vehicle by a table illustrating a relationship between the driving mode and the plurality of control units on the display; and a selection unit configured to allow a driver to freely select the driving mode stored in the driving mode storage unit.

2. The vehicle control system according to claim 1, wherein each of the control units is one of an engine control unit configured to control an engine, a transmission control unit configured to control an automatic transmission, a brake control unit configured to control a brake, a steering control unit configured to control power steering, a suspension control unit configured to control a stiffness of a suspension, and a passenger protection control unit configured to control a seat belt and an air bag.

3. The vehicle control system according to claim 1, wherein the driving mode stored in the driving mode storage unit is one of:

a throttle opening limiting mode in which an increase in throttle opening in relation to an increase in accelerator opening is restrained, an inter-vehicle distance increase mode in which an inter-vehicle distance setting is corrected to an increased distance in the vehicle following control for following a preceding vehicle by maintaining a distance between the vehicle and the preceding vehicle at the inter-vehicle distance setting, a vehicle speed limit mode in which a vehicle speed setting is corrected to a decreased speed in a constant speed drive control for controlling automatic driving at the vehicle speed setting, and a sideslip prevention control OFF disabled mode in which an OFF selection in an ON/OFF selectable sideslip prevention control is automatically disabled.

4. The vehicle control system according to claim 1, wherein if the abnormality occurs in the control unit, the driving mode selected and activated for the abnormality of the control unit is preferentially set and activated.

5. The vehicle control system according to claim 1, wherein the driving mode execution unit is configured to automatically select the adequate mode.

6. The vehicle control system according to claim 1, wherein the selection unit is configured to allow the driver to freely select the driving mode stored in the driving mode storage unit after the informing unit displays the information.

* * * * *